US008634942B2

(12) United States Patent
Hong et al.

(10) Patent No.: US 8,634,942 B2
(45) Date of Patent: Jan. 21, 2014

(54) CONTROLLER AND OPERATING METHOD THEREOF

(75) Inventors: Su Dong Hong, Pyeongtaek-si (KR); Su Deok Jo, Pyeongtaek-si (KR); Kuk Ho Bae, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 883 days.

(21) Appl. No.: 12/582,678

(22) Filed: Oct. 20, 2009

(65) Prior Publication Data

US 2011/0022200 A1 Jan. 27, 2011

(30) Foreign Application Priority Data

Jul. 24, 2009 (KR) .................. 10-2009-0067690

(51) Int. Cl.
| | |
|---|---|
| G05B 11/01 | (2006.01) |
| G05B 15/00 | (2006.01) |
| G05B 23/02 | (2006.01) |
| G06F 17/00 | (2006.01) |
| G08B 21/00 | (2006.01) |
| G08C 19/12 | (2006.01) |
| H04N 5/44 | (2011.01) |
| H04N 5/50 | (2006.01) |

(52) U.S. Cl.
USPC .................. 700/83; 700/11; 700/84; 700/90; 340/3.71; 340/13.31; 340/660; 340/663; 348/569; 348/734

(58) Field of Classification Search
USPC .............. 700/83, 84, 90, 11; 340/3.71, 13.31, 340/569, 660, 663, 825.69; 345/158, 734, 345/E5.103; 348/569, 734, E5.103
See application file for complete search history.

(56) References Cited

U.S. PATENT DOCUMENTS

| 5,583,491 | A | 12/1996 | Kim | |
|---|---|---|---|---|
| 7,411,515 | B2* | 8/2008 | Giger et al. | .............. 340/636.19 |
| 7,821,495 | B2* | 10/2010 | Park | ............................. 345/158 |
| 7,907,060 | B2* | 3/2011 | Reams | ..................... 340/636.15 |
| 8,082,455 | B2* | 12/2011 | Reams | .......................... 713/300 |
| 2003/0071927 | A1* | 4/2003 | Park et al. | ..................... 348/734 |
| 2005/0017949 | A1 | 1/2005 | Dunn et al. | |
| 2006/0152431 | A1 | 7/2006 | Song | |
| 2007/0064147 | A1* | 3/2007 | Kondo et al. | ................. 348/734 |

FOREIGN PATENT DOCUMENTS

| EP | 577267 A1 * | 1/1994 |
|---|---|---|
| EP | 1703740 A2 | 9/2006 |
| EP | 1763232 A1 | 3/2007 |
| JP | 2003-319290 A | 11/2003 |

* cited by examiner

*Primary Examiner* — Mohammad Ali
*Assistant Examiner* — Jennifer L Norton
(74) *Attorney, Agent, or Firm* — Birch, Stewart, Kolasch & Birch, LLP

(57) ABSTRACT

A device, a remote control unit and method for controlling a plurality of devices, the method including receiving one of a plurality of user commands as an input; and transmitting one of a first and a second of the plurality of control commands in response to the one of the plurality of user commands. The first of the plurality of control commands includes information for simultaneously controlling a first device of a manufacturer and a second device of the manufacturer. The second of the plurality of control commands includes information for controlling the first device without controlling the second device.

10 Claims, 11 Drawing Sheets

Fig. 4
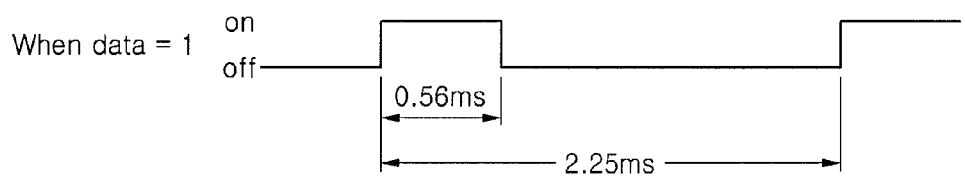
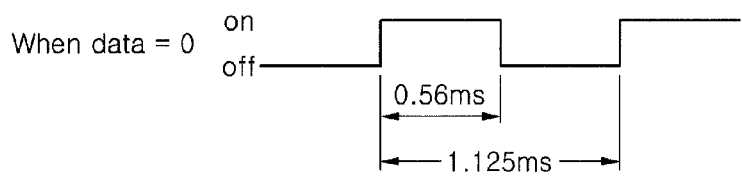
Fig. 5
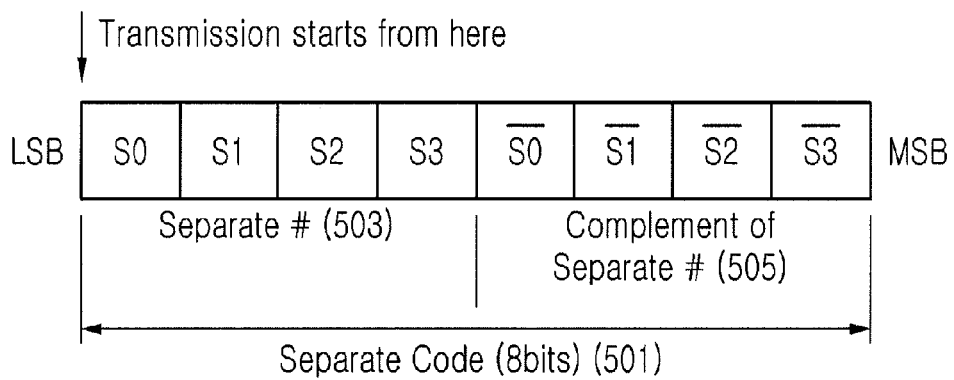

Fig. 7

| RCU select numeric key | Separate code | Remarks |
|---|---|---|
| 0 | LG custom code (0xFB) | Same application as consumer model (for broadcasting) |
| 1 | 0xF0 | TV # 1 |
| 2 | 0xE1 | TV # 2 |
| 3 | 0xD0 | TV # 3 |
| 4 | 0xC3 | TV # 4 |
| 5 | 0xB4 | TV # 5 |
| 6 | 0xA5 | TV # 6 |
| 7 | 0x96 | TV # 7 |
| 8 | 0x87 | TV # 8 |
| 9 | 0x78 | TV # 9 (mode change key) |

700 → row 0, 701 → row 1, 702 → row 2

Fig. 8

| RCU select numeric key | Separate code (LPIB = 0) | Separate code (LPIB = 1) |
|---|---|---|
| 0 | LG custom code (0xFB) | Same application as consumer model (for broadcasting) |
| 1 | 0xF0 | 0x78 |
| 2 | 0xE1 | 0x69 |
| 3 | 0xD0 | 0x5A |
| 4 | 0xC3 | 0x4B |
| 5 | 0xB4 | 0x3C |
| 6 | 0xA5 | 0x2D |
| 7 | 0x96 | 0x1E |
| 8 | 0x87 | 0x0F |
| 9 | Mode change key | Mode change key (Power indicate On/off) |

801, 802

CONTROLLER AND OPERATING METHOD
THEREOF

CROSS-REFERENCE TO RELATED APPLICATIONS

The present application claims priority under 35 U.S.C. 119 and 35 U.S.C. 365 to Korean Patent Application No. 10-2009-0067690 filed on Jul. 24, 2009, which is hereby incorporated by reference in its entirety.

BACKGROUND OF THE INVENTION

1. Field of the Invention

The present disclosure relates to a controller and an operating method thereof, which control a plurality of devices and selectively output the power state of the controller.

2. Discussion of the Background

Generally, when trying to control operations of multimedia machine including a plurality of devices (e.g., televisions) having controlled devices, for example, the same predetermined code (e.g., custom code), a plurality of televisions are typically simultaneously controlled (on/off) according to the control operation of a Remote Controller Unit (RCU).

For example, when two or more televisions are installed in one place such as a commercial market (e.g., for long term care) or an exhibition hall, the use of the same remote controller (the same custom code) may cause adjacent TVs as well as a target TV to be unexpectedly operated. This is an undesirable limitation associated with conventional devices.

SUMMARY OF THE INVENTION

Embodiments provide a controller and an operating method thereof, which selectively output an operation power state of the controller controlling a plurality of devices.

Embodiments also provide a controller and an operating method thereof, an output data format of which include a data domain in which control information to control controlled devices and/or control information indicating a power state of the controller are set. The respective control information is set as output information of an input means of the controller, for example, keys or touch screens.

Embodiments also provide a controller and an operating method thereof, which control a plurality of devices independently or simultaneously according to control information stored in an output data format of an input unit of the controller and user setting. Also, a power state of the controller can be outputted together.

Embodiments also provide a controller and an operating method thereof, which store control information set to a data format controlling a plurality of devices in the controller and a controller device, respectively, and control an operation of the controlled device having information matching the control information outputted from the controller.

Embodiments also provide a controller and an operating method thereof, which display control information set to a data format controlling a plurality of devices and information on a power state of the controller detected by a detecting unit and a control unit of the controller on a controlled device.

Embodiments also provide a controller and an operating method thereof, a data format of which includes 4-bit including control information for controlling each device as well as 8-bit information related to manufacturer/product classification code (custom) and/or information on a power state of the controller, and 4-bit complement information.

Embodiments also provide a controller and an operating method thereof, which simultaneously control all devices like a related-art when a predetermined key, for example, the key "0" is pushed.

Embodiments also provide a controller and an operating method thereof, which may select a controlled device through tough or verbal order methods even though a method of pushing keys provided in the controller is described as an example in the embodiments.

Embodiments also provide a controller and an operating method thereof, which distinguish between 1) a first mode in which all numeric keys provided in the controller are applied with power source, and 2) a second mode in which some numeric keys, for example, the key "9" are not applied with power source when a predetermined key provided in the controller, for example, a mute key is pushed.

Embodiments also provide a controller and an operating method thereof, a data format of which includes control information for controlling a plurality of devices in a first mode, and control information for controlling the plurality of devices and information on a power state of the controller.

Embodiments also provide a controller and an operating method thereof, which change a first mode and a second mode into each other by pushing a predetermined key, for example, the key "9" for a predetermined time, for example, about 5 seconds.

Embodiments also provide a controller and an operating method thereof, which allow a selected key to be easily verified since only current set keys are powered and blinking after a predetermined time, for example, about 0.5 second in a condition that a plurality of keys are blinking in a first or second mode.

In one embodiment, there is a controller for controlling a plurality of devices comprises: an input unit inputting user commands; a transmission unit transmitting control commands based on the user commands; a code storage/output unit storing and outputting the control commands to control controlled devices corresponding to the user commands of the input unit, respectively; and a control unit controlling the units.

In another embodiment, there is a method for controlling a plurality of devices having the same identification information using a controller comprises: setting information for controlling the plurality of devices having the same identification information to an output data format of the controller for controlling the plurality of device; performing at least one of setting of the set control information to the respective devices and selecting of the respective device to be operated according to the control information; and controlling a controlled device having information corresponding to the control information inputted from the controller.

The details of one or more embodiments are set forth in the accompanying drawings and the description below. Other features will be apparent from the description and drawings, and from the claims.

BRIEF DESCRIPTION OF THE DRAWINGS

FIG. 4 is a diagram illustrating 1,0 signal relation in the data format of FIG. 2.

FIG. 5 is a diagram illustrating an exemplary separate code among the data formats outputted from a controller, a remote controller unit.

FIG. 7 is a diagram illustrating an exemplary setting of separate code values to keys of a remote controller unit for control of TVs, respectively.

FIG. 8 is a diagram illustrating an exemplary setting of separate code values and power states to keys of a remote controller unit for control of TVs, respectively.

DETAILED DESCRIPTION OF THE EMBODIMENTS

Reference will now be made in detail to the embodiments of the present disclosure, examples of which are illustrated in the accompanying drawings.

A controller and an operation method thereof according to an embodiment will be described in detail with reference to the accompanying drawings.

First, the terms used herein are selected from terms that are as widely used as possible, but specific terms are arbitrarily selected by the applicant. Because operations and meanings about these specific terms will be described in detail in the detailed description of the invention, the invention should be understood through the operations and meanings of the terms instead of the general terms.

For example, the following paragraphs may describe that a Remote Controller Unit (RCU) controlling TVs, refrigerators, mobile devices, and other multimedia devices by remote is used as a controller. However, but the controller is not limited to the remote controlling device.

An input means of the controller is provided in the controller to input user's commands. The input means may be keys pushed by a user, and may be substituted with various methods such as touch or voice identification that are used to input the user's commands. The input means may be other components such as touch panel, rotary switch or joy stick.

Although, to explain the technical spirit of the present disclosure, the following paragraphs describe as an example that TVs as being controlled devices, the technical spirit of the present disclosure may be applied to control a plurality of other types of devices simultaneously or asynchronously in the case where the plurality of devices having the same custom code (product code and/or manufacturer code) are included within the same control range of a controller. These other devices may be music devices, household appliances, security systems, etc.

Hereinafter, detailed descriptions of embodiments will be made with reference to the accompanying drawings.

Generally, to control various electronic devices such as televisions, set-top boxes, VCRs, and DVDs by remote, an RCU is used as a controller. A user manipulates the RCU to transmit various commands to the above electronic devices for control of the electronic devices.

In this case, a predetermined format (e.g., the Nippon Electric Company (NEC) format) is used as a transmission signal format by which a RCU transmits user's commands to the electronic devices. If a user inputs user commands by manipulating (pushing, touching or activating) an input unit for inputting predetermined user commands, for example, keys or touch pads that are input means provided in the RCU, corresponding control command signals are transmitted to respective electronic devices that are to be controlled by the RCU. In the invention especially claims, the word, push or touch can be interpreted as activate or input.

Figure 1:
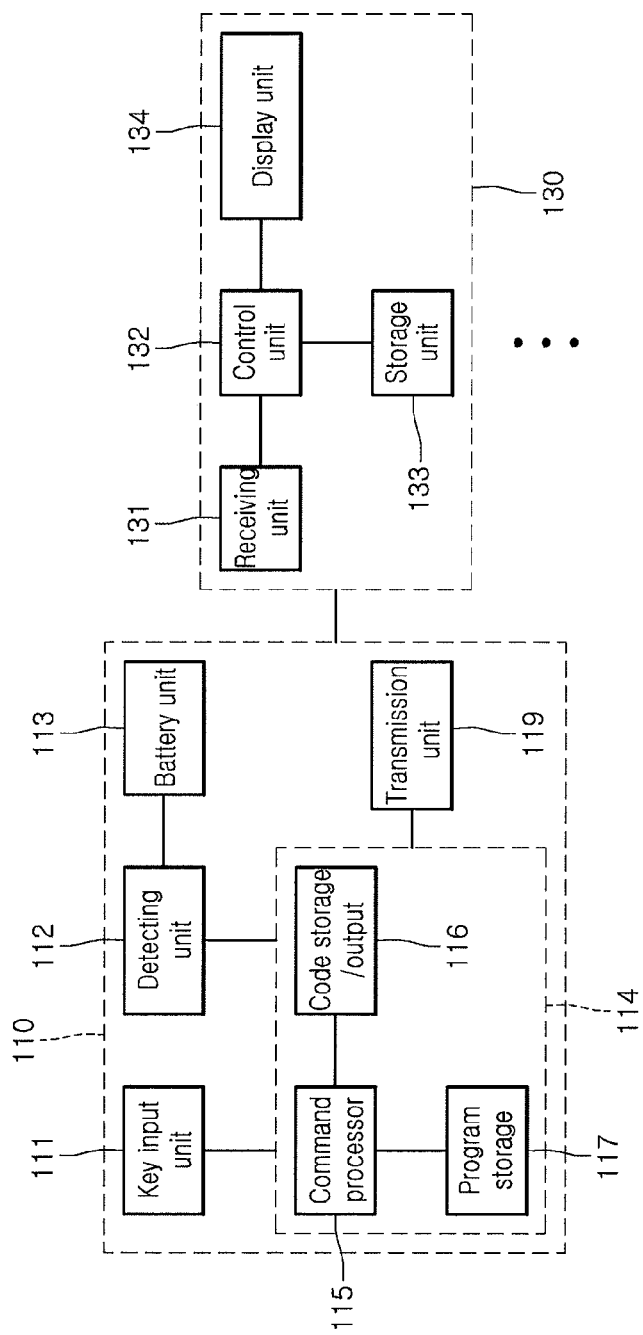
FIG. 1 is a block diagram illustrating a controller and a controlled device, for example, a Remote Controller Unit (RCU) and a TV according to an embodiment.

FIG. 1 is a block diagram illustrating a controller and a controlled device, for example, a RCU and a TV according to an embodiment.

Referring to FIG. 1, a controller 110 and a controlled device 130 controlled by the controller 110 are shown. There may be a plurality of controlled devices 130.

The controller 110, for example, RCU includes a key input unit 111 and a control unit 114. The key input unit 111 includes a plurality of keys as an input means by which user's commands are inputted to control respective devices. When the key input unit 111 is manipulated (pushed or touched), the control unit 114 controls to transmit pre-saved control commands corresponding to respective manipulated keys to the controlled device 130 through a transmission unit 119. The controller 110 may also include a detecting unit 112 and battery unit 113.

The control unit 114 includes a code storage/output 116, a command processor 115, and a program storage 117. The code storage/output 116 stores and outputs control information of respective controlled devices 130 based on a predetermined format. When a key of the key input unit 111 is pushed, the command processor 115 recognizes the key and operates in communication with the code storage/output 116. The program storage 117 stores a program that controls to represent the power state of the program and/or the controller for the controlled devices 130.

The control commands for controlling the controlled devices 130 may be included in a separate memory unit.

Also, the controlled device 130 includes a receiving unit 131, a storage unit 133, a display unit 134, and a control unit 132. The controlled device 130 receives control commands from the controller 110. The storage unit 133 stores an operation program. The display unit 134 outputs the power state of the controller 110.

Figure 2:
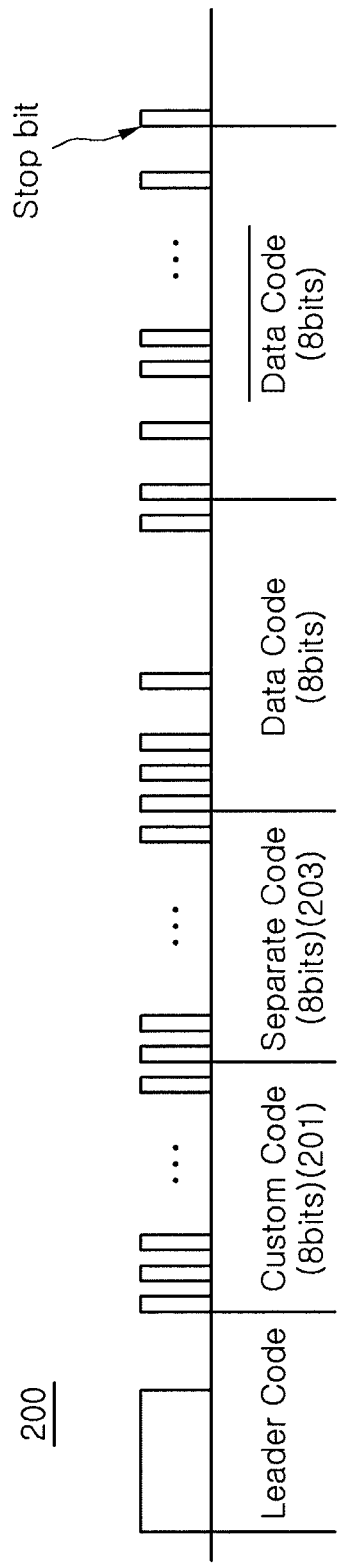
FIG. 2 is a diagram illustrating an exemplary data format outputted from a code storage-output unit of FIG. 1.

FIG. 2 is a diagram illustrating an exemplary data format 200 outputted from the code storage/output 116 of FIG. 1.

A leader (header) code, data codes, and a stop bit of the data format 200 shown in FIG. 2 will be generally described as below.

Figure 3:
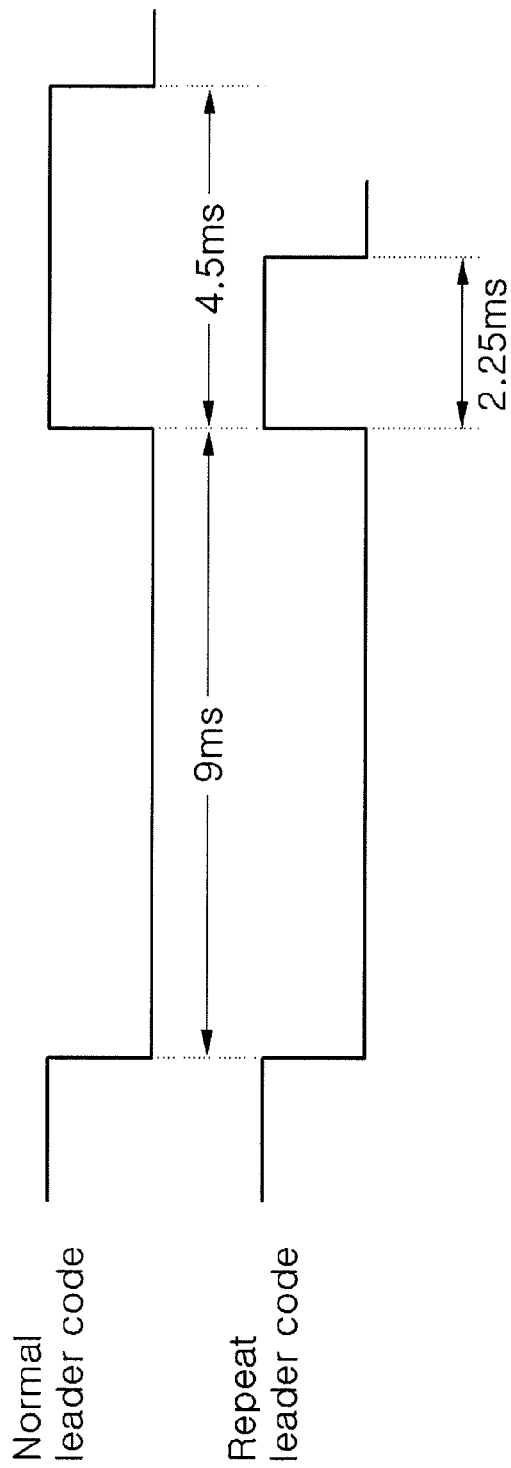
FIG. 3 is a diagram illustrating a leader signal of an infrared (IR) protocol of FIG. 2.

For reference, the leader code signal is a signal informing start of an IR protocol as described in FIG. 3. FIG. 4 is a diagram illustrating a 1,0 signal relation in the data format of FIG. 2.

Figure 6:
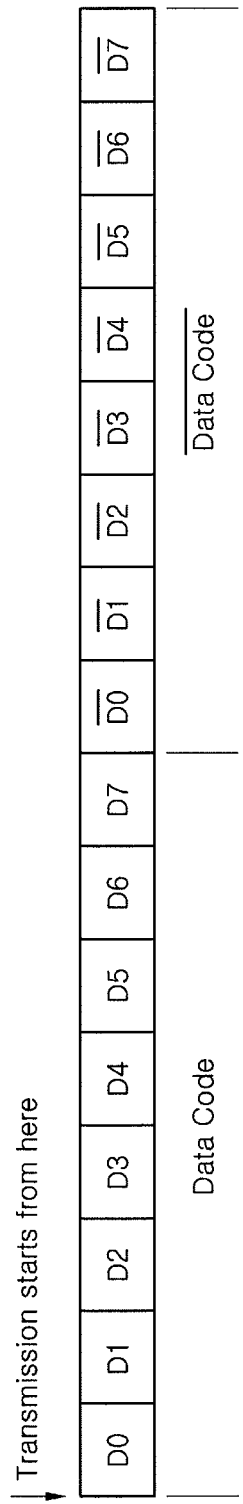
FIG. 6 is a diagram illustrating exemplary data codes.

FIG. 6 is a diagram illustrating exemplary data codes. The data code includes 8-bit data and inverted/data (i.e., complement value). The inverted/data is transmitted in an 8-bit/data code to ensure data integrity.

The sum of the data codes and the inverted data codes is always 0xFF, facilitating verification of data after reception. A value of the data code is used identically to a value of a general remote controller.

The main feature of the embodiment in FIG. 2 is a custom code 201 for discriminating manufacturers or types of electronic devices, and a separate code 203 that is control information to be set corresponding to each key for controlling the controlled devices 130, respectively, and control information that represents a power state of the controller 110. Thus, hereinafter, descriptions will be focused on the custom code 210 and the separate code 203.

The custom code is a control code that is set for each electronic device of a manufacturer. Generally, the electronic devices of the same manufacturer or the same model family have the same custom code.

For example, televisions of LG ELECTRONICS often have a custom value of 0x04. Other products are assigned with values except 0x04. That is, 0x04 is a custom code value for a remote controller that is a TV controller of LG ELECTRONICS.

Hereinafter, main features of the present disclosure will be described in detail.

When a plurality of TVs having the same custom code coexists within the same control frequency domain of a remote controller, all TVs are collectively controlled if the conventional remote controller attempts to control any TV.

However, in the current embodiment, even when the a plurality of devices having the same custom code coexist in the same control frequency domain, each device may be independently controlled by separately including a separate code in a data format outputted from a controller and outputting different control information for each key pushed by a user.

Specifically, a general 16-bit custom code is divided into an 8-bit custom code and an 8-bit separate code. The separate code includes control codes (control commands) stored in each key of a remote controller as described in FIG. 7. In this case, a TV set having a control code matching a control command outputted by manipulating a key is controlled.

That is, the 8-bit custom codes identically assigned to all TVs and code values (see FIGS. 7 and 8) included in the separate code are together transmitted from the remote controller. Accordingly, even if the custom code values are the same, each TV may be individually controlled because the separate codes are different.

FIG. 5 is a diagram illustrating an exemplary separate code among the data formats outputted from a controller, a remote controller unit of FIG. 2.

As described in FIG. 5, a 4-bit subcode 503 among the 8-bit separate code 501 is used in storing a control command for the control of each TV each key of the remote controller as described in FIG. 7, or used to represent the power state of the remote controller during control of TVs as described in FIG. 8.

On the other hand, another 4-bit subcode 505 among the 8-bit separate code 501 is used to ensure the integrity of data. That is, the other 4-bit subcode 505 may be used to check an error when interference occurs on the infrared ray (IR) of the remote controller by an external IR (three-wavelength) or the like.

Hereinafter, the separate code of FIG. 5 will be more fully described.

The separate code includes 1-byte code to individually control a plurality of devices, for example, TVs. Within the 1-byte code, separate numbers (#s) (0, 1, 2, and 3) are set as a lower nibble 503, and a complement of the lower nibble is set as an upper nibble 505 to ensure the integrity of data.

There are two methods for configuring the separate #s. One method includes using a mode 1 that may assign up to maximum fifteen devices using all selectable combinations of 4-bits, and the other method includes using a mode 2 that may assign up to eight devices using 3-bits and use the most significant bit (MSB) 1-bit (S3 in FIG. 5) of the separate # bits as a low battery indicator of the controller. In mode 2, the low battery indicator indicates a normal state (LPIB=0 in FIG. 8) when the MSB 1-bit is "0", and outputs a low battery state (LPIB=1 in FIG. 8) on the TV to together display battery information for users when the MSB 1-bit is "1". (LPIB=low power indicate bit)

In mode 2, the separate 3-bits (S0, S1, and S2) may select eight individual TVs.

A mode verification method and a separate # assignment method will be additionally described with reference to FIG. 9.

FIG. 7 shows each TV corresponding to each code value of 4-bits (mode 1), and FIG. 8 shows each TV corresponding to each code value of 3-bits and each TV on which the power state of a remote controller is together outputted.

Referring to FIG. 7, the remote controller includes keys that are input means capable of inputting user's commands. When the separate code of FIG. 5 is 4-bits, each key or a combination of plural keys may be set to independently control up to maximum fifteen TVs.

A total of sixteen cases may exist in 4-bits. When one value among the sixteen cases, for example, "0" of the remote controller is selected, as described in FIG. 10, the remote controller is set to be controlled identically with a conventional remote controller. That is, if "0" key of the remote controller is selected, the separate codes of FIGS. 2 and 5 are set to be used as an inverter custom code 803 that has been used in the conventional art.

Accordingly, if "0" is selected, the IR protocol is identical to that of general consumers (i.e., as a common remote controller). The remote controller according to this embodiment may be used in common and for broadcasting because the remote controller can perform functions of a general remote controller.

Figure 10:
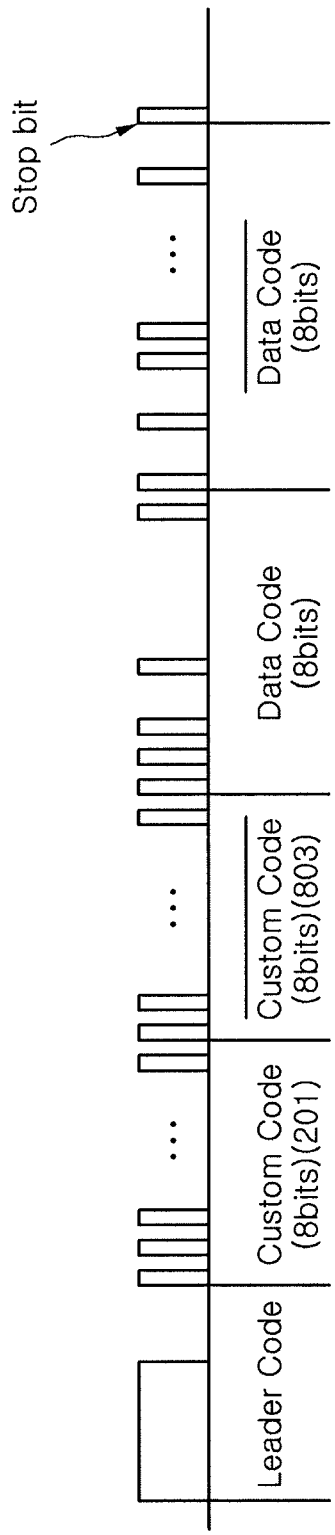
FIG. 10 is a diagram illustrating an exemplary infra-red (IR) protocol format when the numeric key "0" of a remote controller is selected.

As illustrated in FIG. 7, when the key "0" of the remote controller is selected, the separate code 203 of FIG. 2 is operated as an inverter custom code 803 of the custom code as described in FIG. 10, and thus is set to be used in common and for broadcasting. (700)

The custom code corresponds to a type of manufacturer/device (product). The custom code of TVs manufactured by LG ELECTRONICS is 0x04. Accordingly, the inverter custom code value of 0x04 is set corresponding to "0" of the remote controller as a complementary value (0xFB) of 0x04. When a user pushes the key "0", the remote controller is compatibly operated like a general remote controller based on the inverter custom code value.

On the other hand, other keys of the remote controller may be set to control each TV base with separate code values. (701 and 702)

For example, a numeric key "1" of the remote controller may be set to a first TV as "0xE1" based on "0000" as a 4-bit separate code 503 and 4-bit "FFFF" may be set as a complementary value of the separate code. (701)

A numeric key "2" of the remote controller may be set to a second TV as "0xE1" based on "0001" as a 4-bit separate code 503 and 4-bit "FFFE" may be set as a complementary value of the separate code. (702)

4-bit separate codes and complementary value of the 4-bit separate codes are set to each key based on the above manner. Thus, only a TV corresponding to each key can be controlled by distinguishing each TV based on the above setting values.

When the 4-bit separate code is used to control only TVs in mode 1, ten or more TVs may be controlled by combining two or more keys of the remote controller because there are only nine keys in the remote controller except the numeric key "0" that is separately used.

The mode 2 of FIG. 8 has a difference from FIG. 7 in that 3-bits among the 4-bit separate codes of FIG. 5 is used to control TVs, and the other 1-bit (S3 in FIG. 5) is used to indicate the power state of the controller.

As described in FIG. 1, a detecting unit 112 of the controller 110 verifies the battery state of a battery unit 113. A control unit determines whether the amount of the battery satisfies a predetermined amount of the battery. If the battery state is normal, LPIB (low power indicate bit) is set "S3=0". If the battery state is abnormal, LPIB is set "S3=1".

Accordingly, as described in the reference numeral 801 of FIG. 8, when LPIB is normal (S3=0), code values are set to keys to identify/control TVs as described in FIG. 7, respectively. That is, since a value indicating the power state is "S3=0", codes for controlling each TV are set to each key using 3-bit (S2S1S0). Thus, 4-bits are used to control TVs in FIG. 7, and 3-bits (S2, S1, and S0), except S3=0 that indicates the battery state, are used to control TVs in FIG. 8.

On the other hand, if LPIB is abnormal (S3=1), then codes to control TVs are set using 3-bits, and simultaneously information indicating that the power state is abnormal is indicated using other 1-bit. Accordingly, different code values from the case where LPIB is normal are set to each key.

Accordingly, control commands 802 including a code value in which S3 starts with "1" and a complementary value of the code value are assigned to each key of the remote controller. For reference, when the power state of the remote controller is abnormal, i.e., S3=1, the separate code 503 of FIG. 5 is set to 1###, and different codes are used from the case where the battery is normal. Accordingly, a TV control value by a first key is set based on a binary number, eight (S3S2S1S0=1010) and a binary number, complementary value (7=0101).

Code setting of FIG. 8 will be described as an example.

There are two examples to consider when a remote controller is set to the mode 2 and the key 4 is set to binary number 3 0011.

1) The first scenario is when the battery state of the remote controller is in a low battery state, S2=0, S1=1, S0=1, and S3 (LPIB)=1. That is, when transcribed from the MSB in FIG. 5, the separate code value becomes a binary number 1011 and a complementary value thereof is 0100. Accordingly, final data transmitted from the remote controller becomes 01001011. That is, 0x4B is outputted.

2) The second scenario is when the power state of the remote controller is normal, S3=0. Thus, the data becomes 11000011, outputting 0xC3.

The operation of using the key "0" in the mode 2 of FIG. 8 is identical to the operation of using the key "0" in FIG. 7. Hereinafter, a mode change by the use of the key "9" and a mode setting state verification will be described in detail.

Figure 9:
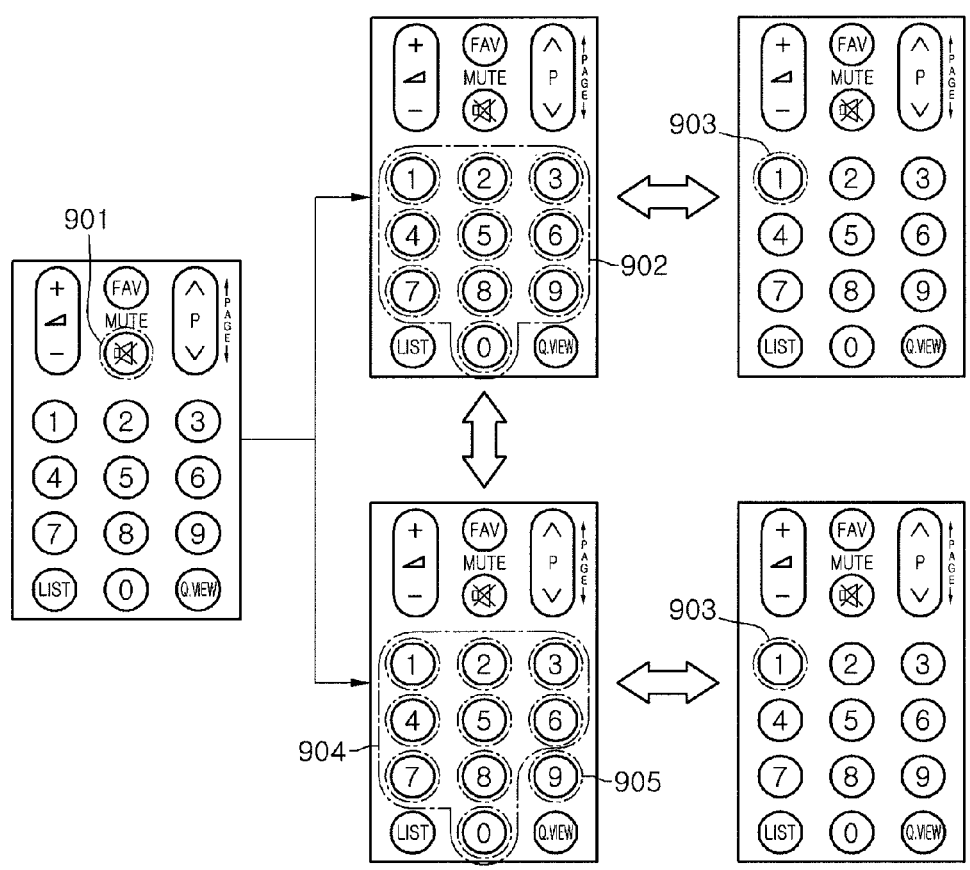
FIG. 9 is a diagram illustrating an exemplary user interface indicating a mode verification and a remote controller control.

FIG. 9 is a diagram illustrating, when a predetermined specific key of a remote controller, for example, a mute key is manipulated, a process of verifying a current operation mode based on whether a predetermined specific key (e.g., key "9") is operated, selecting a TV to be controlled by pushing a specific number key, and changing a mode by pushing a predetermined specific key (e.g., key "9") for a predetermined time or more.

In the case where a protocol is set based on FIGS. 2, 5, 7 and 8, that is, TVs are set to be controlled through a transmission data format setting and a controller, an exemplary user interface (UI) that a user can easily implement will be described in detail with reference to FIG. 9.

It is important that a target TV may easily be selected by a remote controller even though a protocol is determined.

As an example, provided is a method for verifying a current separate # setting (modes 1 and 2) without a separate display device of a remote controller and selecting a control of a specific TV through an operation of a mute key 901 and/or numeric keys 903 that are provided in all TV remote controllers.

As another example, a current mode may be displayed on a display screen of a controller or a TV. For example, a mute key 901 is pushed for a predetermined time, for example, about 5 seconds or more. If all numeric keys 902 are blinking, a mode 1 is verified. If some numeric keys 904 are blinking and other keys 905 are not blinking, a mode 2 is verified.

If trying to changing the verified modes, a predetermined key (for example, key "9") may be pushed for a predetermined time (for example, about 5 seconds).

Only a numeric key 903 of a TV controlled by a current separate code setting may be blinking at a predetermined time after the numeric keys 902 and 904 are blinking, facilitating an implementation of this embodiment.

As another example, a current mode and/or a current operation setting state may be displayed on the controller or the display screen of the TV.

If the numeric key "0" is selected as described in FIGS. 7 and 8, the 8-bit separate # of the remote controller is used as an inverter custom code 803 as described in FIG. 10, and thus is operated in a broadcast #, having a compatibility with consumer models and simultaneously controlling the total set.

FIG. 10 is a diagram illustrating an exemplary IR protocol format when the numeric key "0" of a remote controller is selected. As described above, when the numeric key "0" is selected, IR protocol is the same as that of a general consumer. Accordingly, the remote controller may be used in common and for broadcasting.

Figure 11:
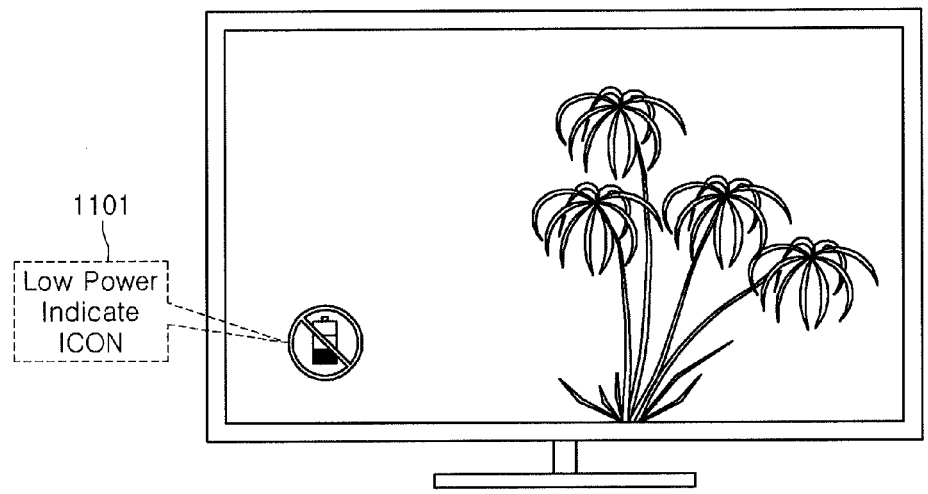
FIG. 11 is a diagram illustrating a power state for control of a corresponding TV when a controller is set to a mode 2 and the power state of the controller is verified to be low according to an embodiment.

FIG. 11 is a diagram illustrating a power state for control of a corresponding TV when a controller is set to a mode 2 and the power state of the controller is verified to be low. When a user pushes a corresponding key to control a specific TV in the condition that the controller is set to the mode 2, power state information as well as control information of the corresponding key are outputted as described in the reference numeral 802 of FIG. 8. Thus, a TV corresponding to the control information is controlled, and the power state information is displayed (1101).

Figure 12:
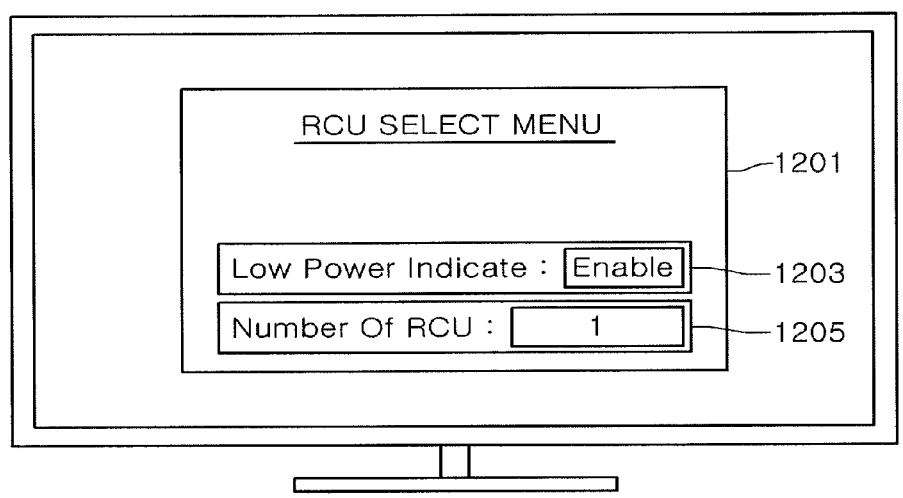
FIG. 12 is a diagram illustrating an exemplary setting of desired functions in TVs to implement the functions in the TVs, respectively.

FIG. 12 is a diagram illustrating an exemplary setting of desired functions in TVs to implement the functions (TV control controlled by the controller and/or power state display of the controller) in the TVs, respectively.

A selection # of a remote controller to be decoded is also selected in the TV. FIG. 12 shows a menu 1201 though which a user selects the selection # in the TV.

A select menu may be accessed by pushing a predetermined key of a remote controller or a TV for a predetermined time. When a UI state is a select menu state, all selection # (output the power state, enable/disable 1203, select TV to be controlled 1205) are decoded.

The selection may be performed using the numeric keys or local keys of TV. Generally, initial values are currently-set values.

Figure 13:
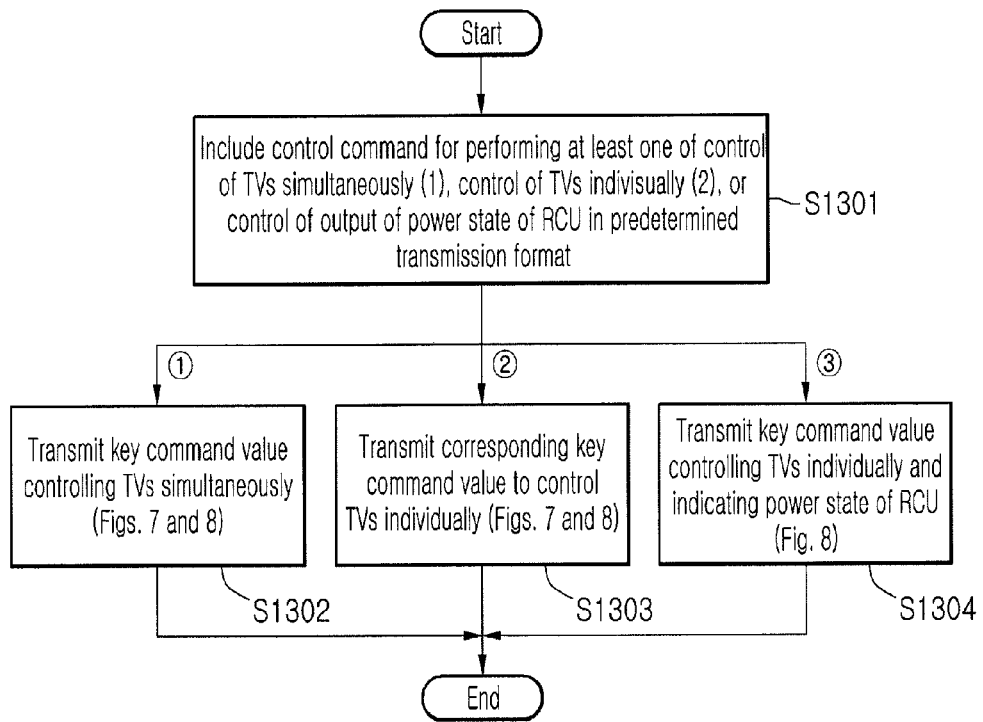
FIG. 13 is a flowchart generally illustrating an embodiment.

FIG. 13 is a flowchart generally illustrating an embodiment.

As described in FIG. 13, in operation S1301, to 1) control a plurality of TVs simultaneously 2) control the plurality of TVs individually, and 3) output at least one power state of RCU, specific bits (separate code) are included in a predetermined transmission format, for example, an NEC format as described in FIG. 2.

Control commands as described in FIGS. 7 and 8 are set using the above separate code.

In operation S1302, a predetermined key, the key "0" may be pushed to simultaneously control a plurality of TVs.

In operation S1303, the respective numeric keys of FIGS. 7 and 8 may be pushed to control each TV.

In operation S1304, the respective numeric keys set to the reference numeral 802 of FIG. 8 may be pushed to control each TV and indicate the power state of RCU.

Figure 14:
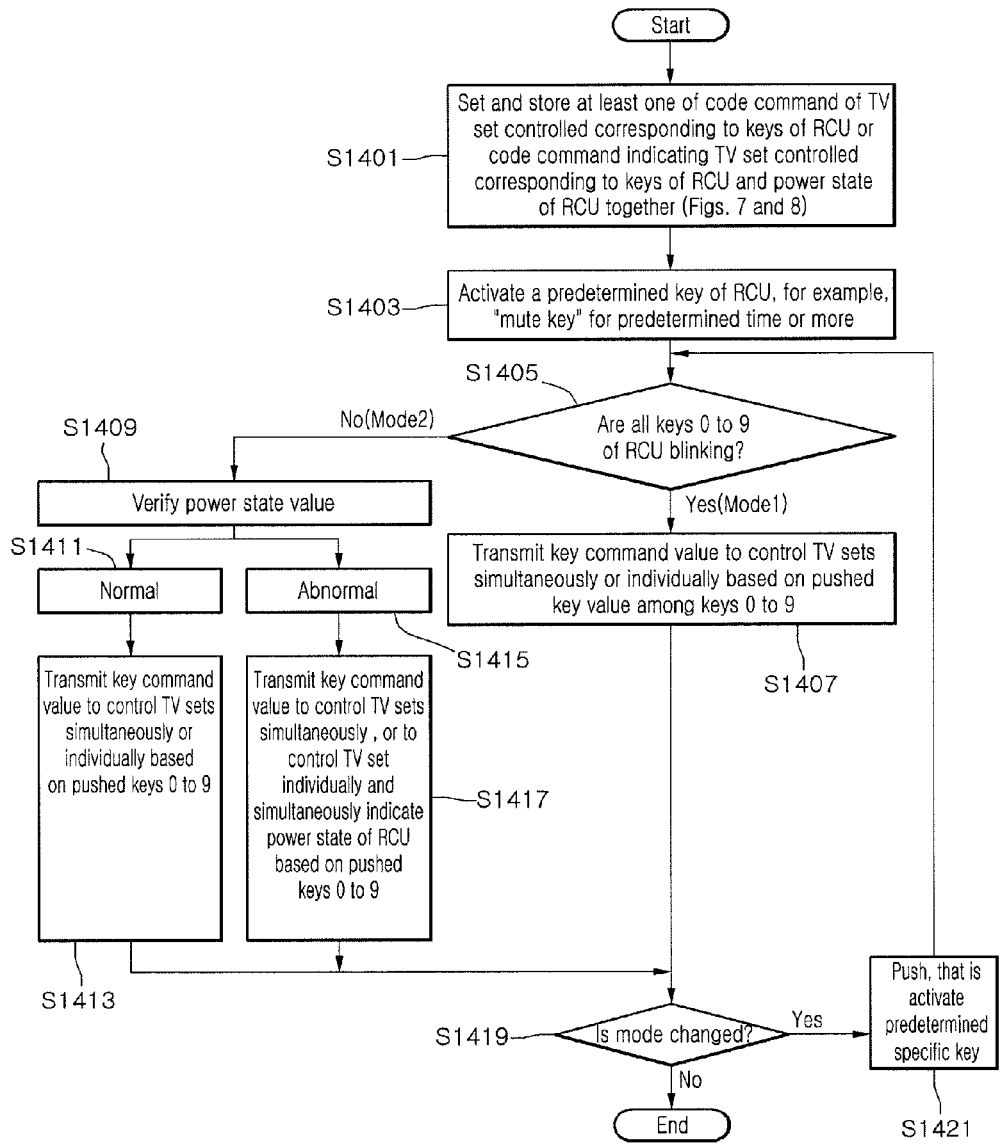
FIG. 14 is a flowchart generally illustrating operation according to an embodiment.

FIG. 14 is a flowchart generally illustrating operation according to an embodiment.

In operation S1401, code commands of each TV set to be controlled corresponding to each key of RCU, and code commands for displaying the power state of the RCU as well as the TV set to be controlled are set and stored as described in FIGS. 7 and 8.

In operation S1403, a predetermined key of the RCU, for example, the mute key is pushed for a predetermined time or more as described in FIG. 9.

In operation S1405, if all the keys 0 to 9 of the RCU are blinking, a mode 1 is determined, and if not, a mode 2 is determined.

In the mode 1, that is, when TVs are set to be individually/simultaneously controlled, corresponding TVs are controlled by pushing the numerical keys of the remote controller that a user wants to control in operation S1407.

In the mode 2, that is, when the power state of the RCU is set to be also displayed, the power state is verified in operation S1409.

In operations S1411 and S1413, if the power state of the RCU is normal, the respective TVs are controlled by pushing the respective keys 1 to 8 in the reference numeral 801 of FIG. 8, and all the TVs are simultaneously controlled by pushing the key 0.

In operations S1415 and S1417, if the power state of the RCU is abnormal, the respective TVs are controlled by pushing (another expression activating) the respective keys 1-8 in the reference numeral 802 of FIG. 8 and the power state is also outputted as described FIG. 11. On the other hand, all the TVs are simultaneously controlled by pushing the key 0.

In operations S1419 and S1421, the modes 1 and 2 may be changed into another mode by pushing a predetermined specific key as described in FIG. 9.

As described above, the present disclosure relates to a controller and an operating method thereof, which control a plurality of devices and selectively outputs the operation power state.

The present disclosure relates to a controller and an operating method thereof, an output data format of which additionally includes separate control information to control a plurality of devices, for example, TVs as an output means individually/simultaneously, and output an abnormal state of the operation power of an RCU corresponding to the controller.

A controller and an operating method thereof can control a plurality of devices, for example, TVs as an output means individually or simultaneously by adding separate control information to an output data format of the controller, and output the abnormal state of the operation power of an RCU corresponding to the controller.

Accordingly, the controller and the operating method thereof can provide modes that can independently control each output means by adding the separate control information to the output data format of the controller and pre-processes claims of a user by verifying the battery state of the remote controller.

Moreover, the controller may be used in common and for broadcasting by performing the same functions as the IR protocol of a general consumer (related-art remote controller) using a predetermined specific key.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A controller configured to control a plurality of devices, the controller comprising:
    an input unit configured to input a plurality of user commands;
    a code storage/output unit configured to store a plurality of control commands;
    a transmission unit; and
    a control unit configured to control the input unit, the code storage/output unit and the transmission unit to selectively transmit either a first control command or a second control command of the plurality of control commands in response to one of the plurality of user commands,
    wherein the first control command includes a custom code for simultaneously controlling a first device and a second device,
    wherein the custom code discriminates manufacturers of or types of devices,
    wherein the first device and the second device have the same custom code,
    wherein the second control command includes the custom code and a separate code for controlling the first device without controlling the second device,
    wherein the controller further comprises:
    a battery unit configured to supply power to the controller; and
    a detecting unit configured to detect a power state of the battery unit,
    wherein the control unit is configured to provide a current mode based on a user command,
    wherein, when the current mode is mode 1, the separate code includes identification information of the first device,
    wherein, when the current mode is mode 2, the separate code includes the identification information of the first device and power state information of the controller,
    wherein the input unit includes at least one key, and
    wherein the user command is pushing the at least one key for a predetermined time.

2. The controller according to claim 1,
    wherein the controller is further configured to transmit the detected power state of the battery unit using the separate code including 3-bits of identification information corresponding to the first device and 1-bit as information indicating the detected power state in mode 2, and wherein the separate code including the 3-bits of identification information is configured to be assigned up to a maximum eight devices by using all selectable combinations of 3-bits.

3. The controller according to claim 1, wherein the control unit is configured to assign the second control command to the first device based on a user assignment.

4. The controller according to claim 1,
wherein the control unit is configured to determine whether the at least one key blinks depending on the current mode.

5. The controller according to claim 1,
wherein the separate code includes 4-bits of identification information corresponding to the first device in mode 1, and
wherein the separate code including the 4-bits of identification information is configured to be assigned up to a maximum of fifteen devices by using all selectable combinations of 4-bits.

6. A method of controlling a plurality of devices with a remote control device having a plurality of control commands stored therein, the method comprising:
receiving, via an input unit of the remote control device, one of a plurality of user commands as an input;
selectively transmitting, by the remote control device, one of a first control command and a second control command of the plurality of control commands in response to the one of the plurality of user commands,
wherein the first control command includes a custom code for simultaneously controlling a first device and a second device,
wherein the custom code discriminates manufacturers of or types of devices,
wherein the first device and the second device have the same custom code, and
wherein the second control command includes the custom code and a separate code for controlling the first device without controlling the second device;
detecting a power state of a battery unit of the remote control device;
receiving, via the input unit of the remote control device, a user command; and
providing a current mode based on the user command,
wherein, when the current mode is mode 1, the separate code includes identification information of the first device,
wherein, when the current mode is mode 2, the separate code includes the identification information of the first device and state information of the controller,
wherein the input unit includes at least one key, and
wherein the user command includes pushing the at least one key for a predetermined time.

7. The method according to claim 6, further comprising:
transmitting the detected power state of the battery unit using the separate code including 3-bits of identification information corresponding to the first device and 1-bit as information indicating the detected power state in mode 2, and
wherein the separate code including the 3-bits of identification information is configured to be assigned up to a maximum eight devices by using all selectable combinations of 3-bits.

8. The method according to claim 6, further comprising:
assigning the second control command to the first device based on a user assignment.

9. The method according to claim 6,
wherein the providing of the current mode comprises blinking the at least one key when the current mode is mode 1.

10. The method according to claim 6,
wherein the separate code includes 4-bits of identification information corresponding to the first device in mode 1, and
wherein the separate code including the 4-bits of identification information is configured to be assigned up to a maximum of fifteen devices by using all selectable combinations of 4-bits.

* * * * *